Patented Nov. 19, 1935

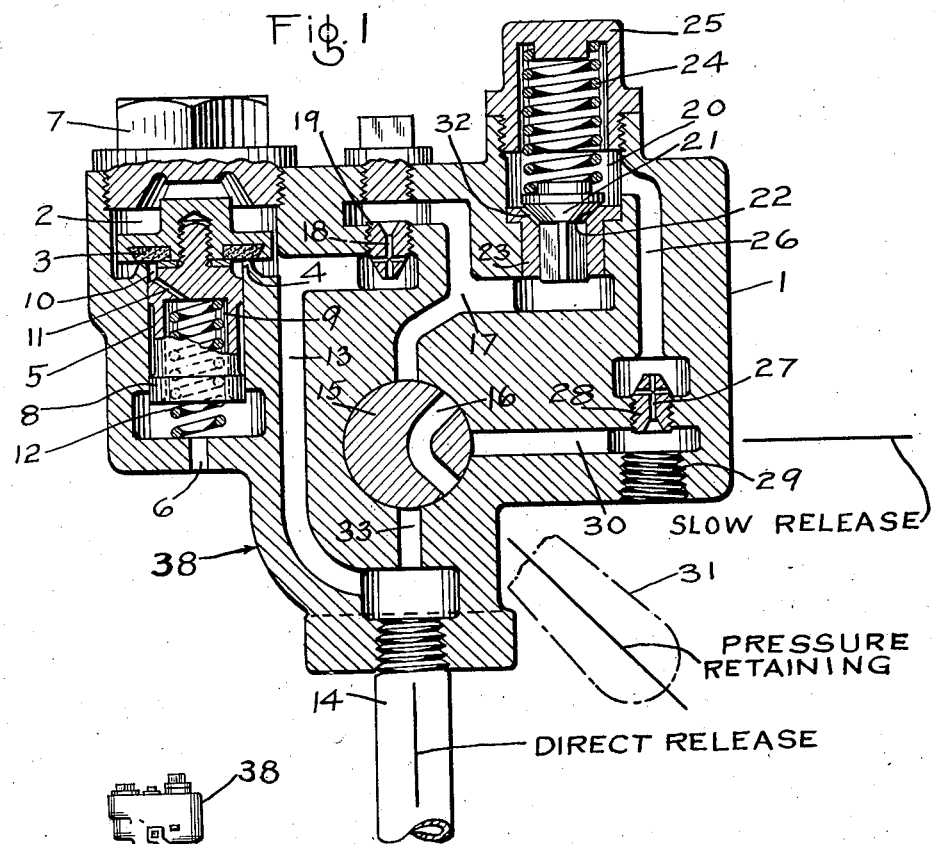
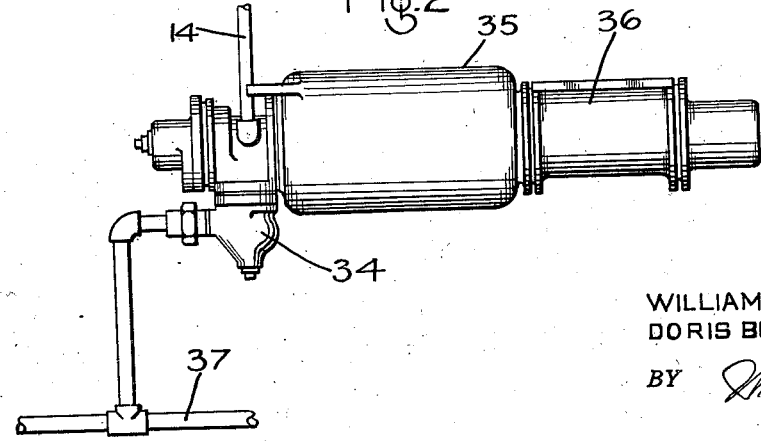

2,021,838

UNITED STATES PATENT OFFICE 2,021,838

RETAINING VALVE DEVICE

William E. Dean, Jr., deceased, late of Hamilton, Ontario, Canada, by Doris Brown Dean, executrix, Edgewood, Pa., assignor to The Westinghouse Air Brake Company, Wilmerding, Pa., a corporation of Pennsylvania Application May 23, 1934, Serial No. 727,095

3 Claims. (Cl. 303—79)

This invention relates to fluid pressure brakes, and more particularly to a brake cylinder pressure retaining valve device.

The conventional fluid pressure brake cylinder is provided with a leakage groove which establishes communication from the piston chamber at one side of the brake cylinder piston to the atmosphere in the spring chamber at the opposite side of said piston, so that fluid under pressure which may leak through the triple valve device into said piston chamber will be vented to the atmosphere and thus avoid building up a pressure in the piston chamber sufficient to cause the brakes to creep on.

When brake pipe pressure is reduced to effect a service application of the brakes, the rate of reduction in brake pipe pressure in the rear portion of a long train may only be sufficient to cause the triple valve devices on cars in that portion to only partially open their service ports, with the result that fluid under pressure being supplied to the brake cylinders on those cars at a slow rate, may leak off through the leakage grooves in the brake cylinders and thereby prevent an application of the brakes from being effected in that portion of the train.

One object of the invention is to avoid the above mentioned difficulty, and to accomplish this object there is provided means preferably associated with a retaining valve device and intended to serve as a substitute for the usual leakage groove in a fluid pressure brake cylinder, said means being operative to normally maintain communication from the brake cylinder to the atmosphere and being rendered ineffective upon movement of the triple valve device to its application position.

When trains, and particularly long trains, are controlled over descending grades, it is the practice to turn the retaining valves to their pressure retaining positions when the train enters the descending grade and to turn them to their direct release positions again when the train reaches a level or adverse grade. Thus, in operating over undulating grades, the retaining valves are repeatedly turned up to their retaining positions and then turned down to their direct release positions, depending upon the grade.

A further object of the invention is to provide an improved retaining valve device having means for obviating the above mentioned need for repeatedly turning the retaining valves first to their pressure retaining positions and then to their direct release positions, and for this purpose the retaining valve device has, in addition to the direct release position, one position in which fluid under pressure is completely released from the brake cylinder at a predetermined slow rate, which will allow sufficient time for recharging the auxiliary reservoir to a safe operating pressure without unnecessarily decreasing the speed of the train on light descending grades, and having another position in which said device functions in substantially the same manner as the usual retaining valve device to release fluid under pressure from the brake cylinder at one rate until the brake cylinder pressure has been reduced to a predetermined degree, which rate is slow enough to enable the train to be safely controlled on a heavy descending grade and slower than the first mentioned rate, whereupon said device functions to release the remaining fluid under pressure from the brake cylinder at a still slower rate. This final venting of fluid under pressure from the brake cylinder is for the purpose of insuring the brakes remaining applied for a predetermined period of time after the retaining valve device has been moved to its retaining position.

Since, in neither of the above mentioned positions does the retaining valve device embodying the invention have a closing value, if the train is approaching a level or adverse section of a generally descending grade and a brake release is initiated in time, all brake cylinder pressure will be exhausted and the train will therefore be as free to move over the level or adverse grade section as though the retaining valve device were in its direct release position.

Another object of the invention is to provide an improved retaining valve device having operating positions in which fluid under pressure may be completely released from the brake cylinder at predetermined slow rates and having means for promptly releasing the last few pounds of brake cylinder pressure, such as five pounds, when effecting a release of the brakes with the retaining valve device turned up to an operating position, so that the brake cylinder piston may return promptly to full release position and thereby avoid dragging of the brake shoes against the car wheels, with consequent unnecessary brake shoe wear.

Other objects and advantages will appear in the following more detailed description of the invention.

In the accompanying drawing: Fig. 1 is a sectional view of a retaining valve device embodying the invention, the device being shown turned to its high pressure retaining position; and Fig. 2 is a diagrammatic view of a car brake equipment, showing the improved retaining valve device associated therewith.

As shown in Fig. 2, the car brake equipment may comprise the usual triple valve device 34, auxiliary reservoir 35, brake cylinder 36 and brake pipe 37. The retaining valve device 38 is connected by a pipe 14 with the exhaust port of the triple valve device 34, in the usual manner.

As shown in Fig. 1, the pressure retaining valve device may comprise a casing 1 having a valve chamber 2 containing a valve 3 adapted to seat on an annular seat rib 4 formed in said casing around a bore 5 which is open to the atmosphere through an opening 6 in said casing, the valve chamber 2 being closed at one end by a cap nut 7 having screw-threaded connection with said casing.

The valve 3 may be provided with a barrel-shaped stem 8 slidably guided within the bore 5 and having a bore 9 which extends inwardly for a distance from the outer end of said stem. Said stem may be chamfered immediately below the valve 3 so as to form, with the seating face of the valve, an annular groove 10, and leading from said groove is a restricted passage 11 which opens into the bore 9.

A coil spring 12 interposed between and engaging the casing 1 and the valve stem 8 at the bottom of the bore 9 acts to normally maintain the valve 3 unseated against a predetermined pressure, such as five pounds.

The valve chamber 2 is connected by a passage 13 to the pipe 14 which has screw-threaded connection with the casing 1 and, as aforementioned, leads to the exhaust port of the triple valve device on the car.

Mounted in the casing 1 is a plug valve 15, which is adapted to be rotated through the medium of an operating handle 31 and which has a through port 16. The operating handle has three operating positions, namely: direct release, slow release, and pressure retaining.

A passage 17 leads from passage 13 through a restricted passage 18 in a choke plug 19 and communicates with the plug valve 15.

The casing 1 is provided with a valve chamber 20 containing a retaining valve 21 which is normally maintained seated on a seat 22, provided on a seat member 23 securely mounted in the casing, by a spring 24 contained in the valve chamber 20 and interposed between and engaging said valve and a cap nut 25 which closes one end of the valve chamber 20. The valve 21 controls communication from passage 17 to passage 26 which leads through a restricted passage 27 in a choke plug 28 to an atmospheric exhaust passage 29.

The valve seat 22 is provided with a narrow shallow groove 32. When the valve 21 is seated, the groove 32 forms, with the seating face of said valve, a restricted passage leading from passage 17 to chamber 20.

A passage 33 is provided in the casing 1 leading from the pipe 14 and communicating with the plug valve 15 and a passage 30 is provided communicating with said plug valve and leading to the atmospheric exhaust passage 29.

In operation, assuming that the operating handle 31 is in direct release position, the plug valve 15 is so positioned that the port 16 therein connects passage 33, connecting with pipe 14 and passage 13, to passage 30 leading to the atmospheric exhaust passage 29. The valve chamber 2 being open to passage 13, is therefore normally at atmospheric pressure and the spring 12 acts on the valve stem 8 to maintain the valve 3 away from the seat rib 4, thereby opening communication from chamber 2 through the restricted passage 11 to the bore 9.

When the triple valve device moves to its application position, communication is cut off from the brake cylinder to the exhaust port in said device, as is well understood, and since pipe 14 leads to said exhaust port, communication is thus cut off from the brake cylinder to the retaining valve device. It being presupposed that the usual leakage groove is omitted from the brake cylinder, if the triple valve device is on a car at the rear end of a long train, when the rate of brake pipe reduction is sufficient to cause said device to only partially open the service port and to therefore supply fluid under pressure to the brake cylinder at a slow rate, a brake application on said car is assured, because fluid under pressure supplied to the brake cylinder cannot leak off as it would were a leakage groove provided in the brake cylinder.

With the plug valve 15 in direct release position, fluid released from the brake cylinder, upon movement of the triple valve device to release position, is vented directly to the atmosphere through pipe 14, passage 33, port 16, and passages 30 and 29 at a rapid rate, which may be substantially the same rate as that provided for in the usual retaining valve device.

When the plug valve is turned to slow release position, fluid is released from the brake cylinder directly to the atmosphere, at a slow rate. When the triple valve device moves to release position, fluid under pressure supplied from the brake cylinder to passage 13 through the pipe 14 flows to the valve chamber 2. Due to the restricted flow capacity of passage 11, the fluid pressure acting on valve 3 in chamber 2 to seat said valve builds up rapidly to a degree greater than the pressure of the spring 12 acting to maintain said valve unseated, the latter pressure being substantially the same as that normally required, say five pounds, to move the brake cylinder piston to its application position. The valve 3 is therefore seated on the seat rib 4, thereby cutting off communication from chamber 2 to the atmosphere by way of passage 11, the bore 9 and the atmospheric opening 6.

With the plug valve in slow release position, port 16 connects passage 17 with passage 30, so that fluid under pressure is released from the brake cylinder through pipe 14, passage 13, the restricted passage 18, passage 17, port 16, and passages 30 and 29. If a subsequent application of the brakes is not effected within a predetermined period of time, the brake cylinder will be completely vented. The flow of fluid from the brake cylinder to the atmosphere by way of the restricted passage 18 is preferably at such a slow rate as to prevent the complete release of the brakes during the period of time normally required to recharge the auxiliary reservoirs on the cars throughout the train to a safe operating pressure on light grades.

When the pressure in the brake cylinder, and consequently in valve chamber 2, has been reduced to a predetermined low degree, such as five pounds, the spring 12 will unseat the valve 3, so that fluid will be vented from the brake cylinder through the passage 11 as well as through the restricted passage 18. This final venting of fluid from the brake cylinder is at a relatively rapid rate so as to insure prompt movement of the brake cylinder piston to its full release position.

When the operating handle 31 is turned to the pressure retaining position, as shown in the drawing, the plug valve 15 is so positioned as to lap the port 16. With the plug valve in this position, fluid released from the brake cylinder flows through pipe 14 and passage 13 to valve chamber 2, causing the valve 3 to be seated. Fluid also flows from passage 13 through the restricted passage 18 into passage 17 and causes the valve 21 to be unseated against the opposing pressure of the spring 24. Fluid from the brake cylinder then flows past the open valve 21 to chamber 20 and thence to the atmosphere through passage 26, the restricted passage 27 and the atmospheric passage 29. The two restricted passages 18 and 27 being in series with each other, the rate at which fluid is vented from the brake cylinder in pressure retaining position will be slower than in slow release position.

Now when the brake cylinder pressure has been reduced to such a degree that it can no longer hold the valve 21 unseated, the spring 24 acts to seat the valve. With said valve seated, the flow of exhaust fluid from the brake cylinder to chamber 20 is by way of the restricted passage 32, defined by the seating face of the valve 21 and the groove in the seat member 23. The restricted passage 32 being in series with the restricted passages 18 and 27, with the valve 21 seated, the final venting of fluid from the brake cylinder is at a slower rate than when the valve is unseated. If the brakes are not subsequently applied within a predetermined period of time, the brake cylinder will be completely depleted of fluid under pressure. The release of fluid under pressure from the brake cylinder by way of the restricted passage 32 is preferably at such a slow rate as will prevent undue acceleration of the speed of the train during the period of time normally required to recharge the equipment.

When the pressure in the brake cylinder has been reduced to a predetermined low degree, say five pounds, the valve 3 will be unseated, as hereinbefore described in connection with the slow release position of the retaining valve device, and permit rapid venting of the last few pounds of pressure from the brake cylinder.

It should be noted that when the operating handle 31 is turned up to either slow release position or to the pressure retaining position preparatory to descending a grade, fluid under pressure which may leak through the triple valve device into the brake cylinder, prior to the subsequent application of the brakes, will be vented to the atmosphere past the normally open valve 3, thereby preventing the creeping on of the brakes.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake cylinder, of a valve device controlling a communication through which fluid is vented from the brake cylinder, a spring urging said valve device to open said communication, said valve device being subject on its spring side to the flow at a restricted rate of fluid from the brake cylinder to a passage through which fluid is vented from the brake cylinder and on the opposite side to the flow of fluid to said passage at a more rapid rate for moving said valve device to close said communication when the fluid pressure in said passage is increased by flow from the brake cylinder.

2. In a fluid pressure brake, the combination with a brake cylinder, of a valve device operative to control a vent connection to said brake cylinder and having differential areas subject to the pressure of the fluid vented from said brake cylinder to a passage, and a spring for biasing said valve to the position for opening said vent connection, said valve device being subject on its spring side to the flow, at a restricted rate, of fluid vented from said brake cylinder to said passage and operative upon the flow, at a more rapid rate, of fluid vented from said brake cylinder to said passage to close said vent connection.

3. The combination with a brake cylinder, of a device for controlling the exhaust of fluid from said brake cylinder and having two always open communications of different flow capacities through which said brake cylinder is adapted to be vented to the atmosphere, means for selectively directing the flow of fluid from said brake cylinder through one or the other of said communications, and means operable upon a reduction in brake cylinder pressure to a predetermined pressure to open another communication through which said brake cylinder is vented.

DORIS BROWN DEAN,
*Executrix of the Last Will and Testament of William E. Dean, Jr., Deceased.*